United States Patent Office 3,009,036
Patented Nov. 14, 1961

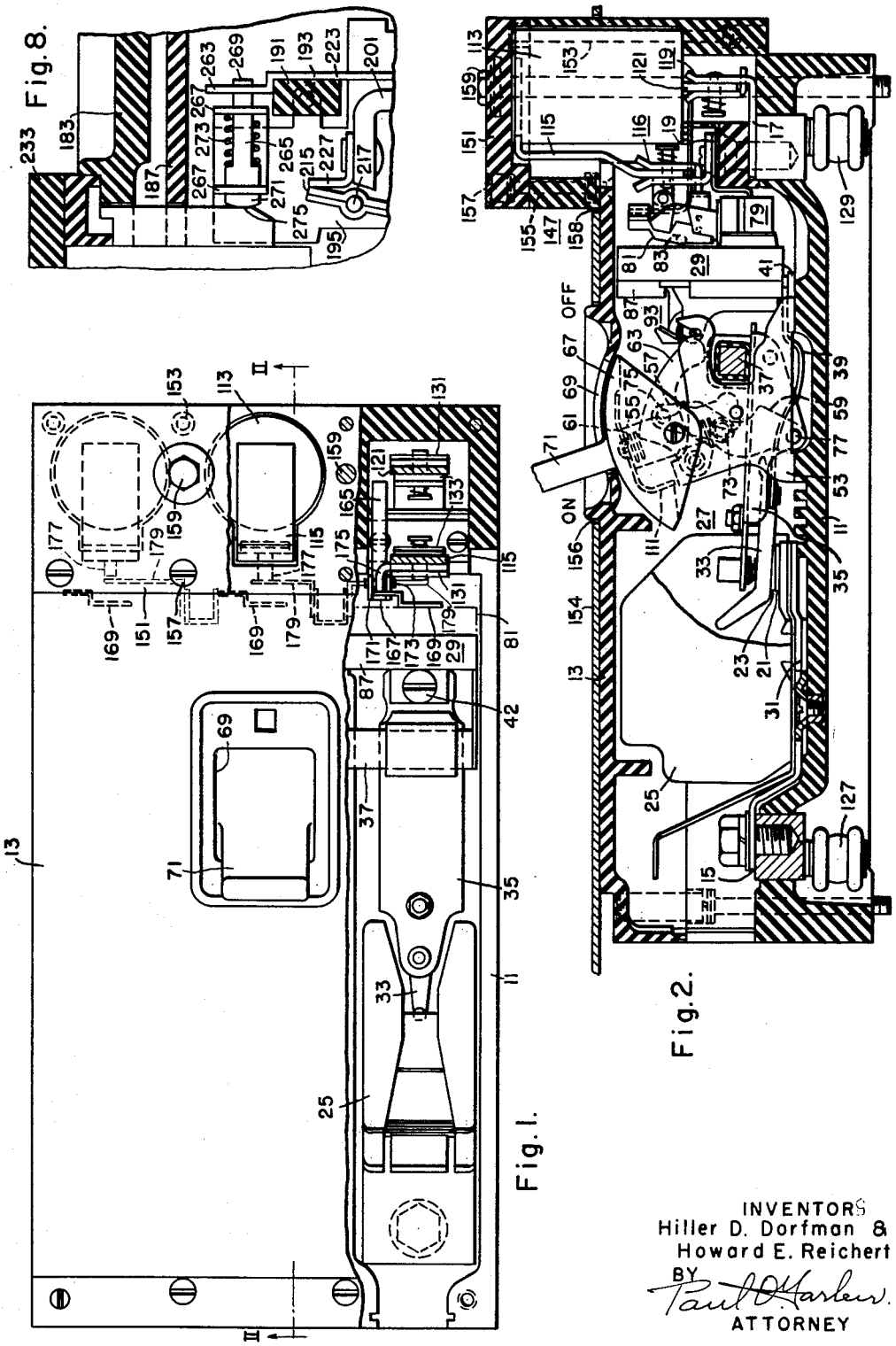

3,009,036
CIRCUIT INTERRUPTER
Hiller D. Dorfman and Howard E. Reichert, Beaver, Pa., assignors to Westinghouse Electric Corporation, East Pittsburgh, Pa., a corporation of Pennsylvania
Filed Aug. 24, 1956, Ser. No. 605,997
21 Claims. (Cl. 200—114)

This invention relates to circuit interrupters and, more particularly, to a circuit interrupter comprising a circuit breaker having fusible means electrically connected in series relation therewith.

Low-voltage circuit breakers, as applied to electric power distribution systems, are designed to continuously carry the current for which they are normally rated, and to interrupt fault currents up to their interrupting capacity. Many such distribution systems, however, are capable of full amplitude fault currents far exceeding the interrupting capacity of low-cost circuit breakers. To safely interrupt a full amplitude short-circuit current of, for instance, 100,000 amperes by means of the commercially available circuit breakers today, would require the use of such a circuit breaker having its major parts designed for a device capable of carrying a continuous load of 4,000 amperes, in order to obtain one having an interrupting capacity of 100,000 amperes.

There are available current-limiting fuses having a rated interrupting capacity of 100,000 amperes. While such fuses do not actually interrupt a current of 100,000 amperes, they have the property of limiting the rise of current and of interrupting the current quickly, during the early part of the first half cycle, before the instantaneous value of the current has risen to a peak value more than a small fraction of the available short-circuit current of the circuit. Thus, when a current-limiting fuse is rated as having an interrupting capacity of 100,000 amperes, it means that the fuse will safely interrupt a circuit in which 100,000 amperes would flow when subjected to a short circuit, if the fuse and its current-limiting function were not present. The peak value of the instantaneous current actually interrupted by such a fuse may be only about 10,000 to 25,000 amperes even though the available short-circuit current of the circuit without the fuse is 100,000 amperes.

This current-limiting action is very desirable in that it protects the circuit, and the apparatus connected therein, from the destructive effects of the maximum available short-circuit current. On the other hand, the use of current-limiting fuses has a number of disadvantages as compared with the use of circuit breakers. For one thing, the current-limiting fuse is a relatively expensive type of fuse and if the circuit is one which is subject to frequent small overloads or to relatively high-resistance short circuits, the cost of repeatedly replacing the fuses becomes a large item.

Another disadvantage in the use of fuses is that a fault on a single conductor of a three-phase circuit may blow only one fuse with the result that single-phase power is supplied over the other conductors. This can result in the burning out of motors or other equipment which may continue to operate on single-phase, though designed for three-phase operation.

Circuit breakers have the advantage over the use of fuses since anyone may quickly and safely restore service by manipulation of the insulated handle of the breaker.

It is an object of this invention to provide a circuit interrupter which largely retains the advantages set forth above of circuit breakers over fuses and at the same time embodies the desirable current-limiting function of current-limiting fuses when there is a heavy short circuit, without requiring the use of an expensive circuit breaker of high interrupting capacity.

In a circuit interrupter for controlling a three-phase circuit equipped with a three-pole circuit breaker and a current-limiting fuse connected in series relation in the circuit through each of the poles, the occurrence of a fault current of sufficient magnitude to blow one of the fuses would usually energize the magnetic tripping means and trip the breaker to open all of its poles. In this situation, it is then possible to relatch and reclose the circuit breaker. This would result in supplying single-phase power with the dangers set forth above. There is also the possibility that the fuse would interrupt the current before the magnetic trip is energized sufficiently to trip the breaker open, in which case the circuit would also be single-phase.

Another object of the invention is to provide a unitary circuit interrupter comprising a circuit breaker having a trip device and current-limiting fuse means connected in series in the circuit through the breaker embodying means actuated by the blowing of any one of the fuse means to operate the trip device to tripping position and hold the trip device in tripped position, thus preventing closing the circuit breaker until the blown fuse is removed.

Failure of the circuit breaker to trip open when one of the fuses blows presents a hazard to a person attempting to remove the blown fuse since contact may be made with live parts of the interrupter which could result in serious injury or possible death to the person working on the fuse.

Another object of the invention is to provide a unitary circuit interrupter, having an insulating housing comprising a base and cover for housing a circuit breaker having plug-in fuse means, with a separate cover for the fuse means. Means is also provided for tripping the circuit breaker open when the fuse means together with the fuse cover is removed.

Another object of the invention is to provide a unitary circuit interrupter, having removable plug-in fuses and a separate cover or housing for the fuses, with a missing fuse interlock. This interlocking means is provided for tripping the circuit breaker open when the fuse is removed and for preventing closing the circuit until the fuse itself is replaced, rather than just its cover or housing.

Another object of the invention is to provide a circuit interrupter comprising a circuit breaker and one or more removable plug-in type fuses wherein cover means is provided which may be sealed to protect at least the trip unit of the circuit breaker from being tampered with, but which sealed cover need not be removed to replace the fuses and having a separate enclosing cover member removable with the fuses and interlocking means for actuating the trip unit to trip the circuit breaker open upon removal of said fuses as distinguished from removal of the enclosing cover member.

A further object of the invention is to provide a unitary circuit interrupter comprising a circuit breaker and endwise plug-in current-limiting fuse means where each fuse has two plug-in contacts, each engageable with a plug-in contact secured to the circuit breaker housing, and in which the plug-in contacts on the fuse and on the housing are engageable and disengageable with each other by movement of the fuse in a direction length-wise of the fuse.

Another object of the invention is to provide a unitary circuit interrupter comprising a circuit breaker and current-limiting fuse means having an insulating enclosing housing for the circuit breaker and a fuse housing for the current-limiting fuse means removably secured to the circuit breaker housing, and embodying interlocking means for effecting opening of the circuit breaker when the fuse housing is removed and for preventing closing the circuit breaker until the fuse housing is replaced.

Another object of the invention is to provide a circuit interrupter comprising a circuit breaker and plug-in type current-limiting fuse means having an enclosing housing for the circuit breaker and a separate housing for said fuse means removable to replace said fuse means in which means is provided for tripping the circuit breaker open when any one of said fuse means blows and which is also provided with interlocking means for tripping the breaker when said fuse means is removed.

Another object of the invention is to provide a multipole circuit interrupter comprising a circuit breaker and a plug-in type fuse electrically connected in series relation with each pole of the circuit breaker, and means for tripping all poles of the circuit breaker open when one or more of the fuses is removed and for preventing closing the circuit breaker until all of the fuses are replaced.

The invention, both as to structure and operation together with additional objects and advantages thereof, will be best understood from the following detailed description thereof when read in conjunction with the accompanying drawings.

In said drawings:

FIGURE 1 is a top plan view, with the cover partly broken away, of a circuit interrupter embodying the principles of the invention.

FIG. 2 is a vertical sectional view taken substantially on line II—II of FIG. 1 and looking in the direction indicated by the arrows.

FIG. 8 is a detail sectional view taken on line VIII—VIII of FIG. 6 showing the means for actuating the trip bar when the fuse housing is removed.

Figure 3:
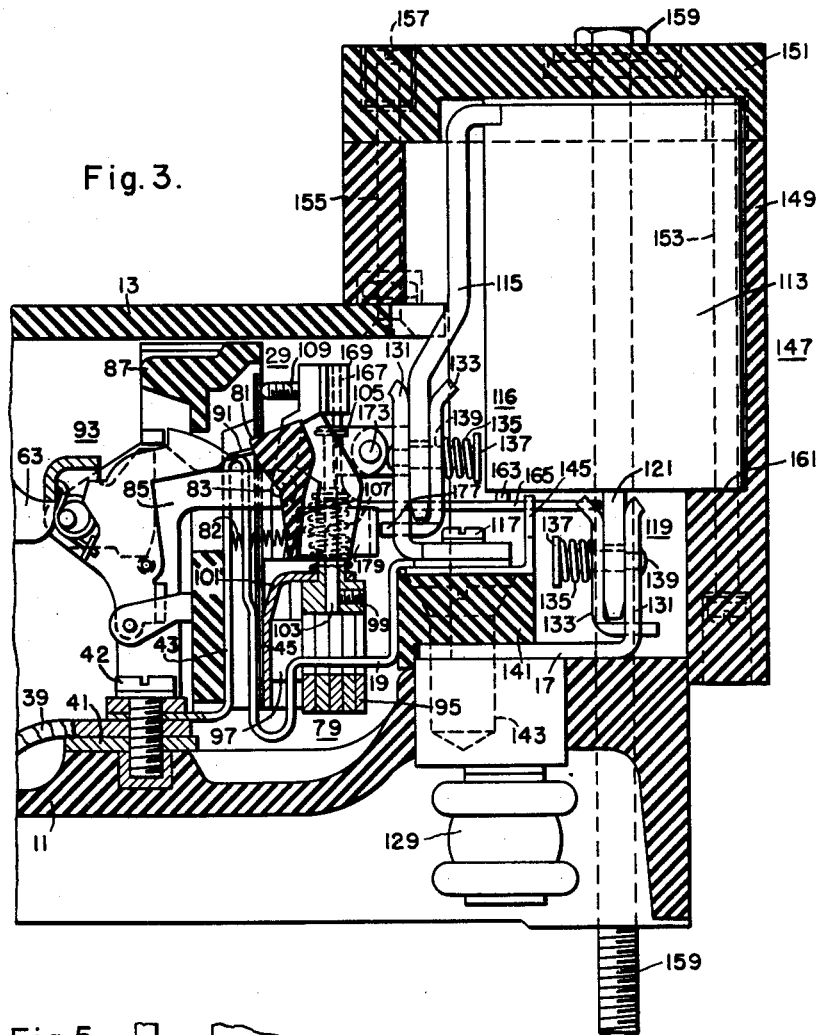
FIG. 3 is an enlarged vertical sectional view of a portion of the circuit interrupter showing the trip device of the circuit breaker and the fuse cover interlock.

Referring to FIGS. 1 and 2 of the drawings, the circuit interrupter comprises a base 11 of molded insulating material on which the several elements of the circuit breaker mechanism and the current-limiting fuses are mounted. A cover 13 of molded insulating material, which may be fastened or sealed to the base 11, cooperates with the base 11 to form an enclosing housing for the circuit breaker.

The circuit interrupter is of the multipole type, each pole having line terminals 15 and load terminals 17, disposed at opposite ends of the base 11 and a terminal 19 (FIGS. 2 and 3) disposed intermediate the ends of the base. The circuit breaker mechanism may be of the general type disclosed in Patent No. 2,508,178, issued May 16, 1950, to T. Lindstrom et al., the mechanism being shown and briefly described herein for purposes of illustration. The circuit breaker includes a stationary contact 21, a movable contact 23 and an arc extinguisher 25 for each pole of the breaker. A common operating mechanism indicated generally at 27 is provided for simultaneously actuating the three movable contacts to open and closed positions, and a removable trip device indicated generally at 29 serves to effect automatic opening of the breaker contacts in response to predetermined overload conditions in the circuit through any pole of the breaker.

The line terminal 15 forms the outer end of a conducting strip 31 which extends into the housing and rigidly supports the stationary contact 21. The movable contact 23 for each pole is rigidly mounted on a contact arm 33 supported on a switch arm 35 secured on a tie bar 37 which extends across all of the poles of the breaker and supports the switch arms for the several poles of the breaker for unitary movement to open and closed positions. The contact arm 33 is connected by a flexible conductor 39 to a terminal 41 (FIG. 3) secured to the base 11 by a screw 42 (FIG. 3) which also serves to secure one end or leg of a heater element 43 to the base. A bimetal element 45 forming a part of the trip device 29 is mounted on the other leg of the heater element 43 which is electrically integral with the intermediate terminal 19.

The operating mechanism 27 (FIG. 1) for the breaker is disposed in the center compartment of the housing and is supported by a pair of frame members 53 (only one being shown) secured to the base 11. The operating mechanism comprises a pivoted forked operating lever 55, a toggle comprising links 57—59, overcenter springs 61 and a pivoted releasable cradle 63 controlled by the trip device 29. An arcuate insulating shield 67 for substantially closing an opening 69 in the cover 13 is mounted on the end of the operating lever 55 and has an integral handle 71 extending out through the opening 69 to permit manual operation of the breaker mechanism.

The toggle links are pivotally connected together by a pivot pin 73. The toggle link 57 is pivotally connected by a pivot pin 75 to the cradle 63 and the toggle link 59 is pivotally connected to the switch arm 35 for the center pole by a pivot pin 77. The overcenter springs 61 are connected under tension between the knee pivot pin of the toggle 57—59 and the outer end of the operating lever 55.

The circuit breaker is operated to open position by manipulation of the handle 71 (FIG. 1) in a clockwise direction to the "off" position actuating the overcenter springs 61 to cause collapse of the toggle 57—59 and opening movement of the switch arms 35 for all of the poles of the breaker in a well-known manner.

The breaker is manually closed by reverse movement of the handle 71 from the "off" to the "on" position which cause the springs 61 to move overcenter and straighten the toggle thereby moving the switch arms 35 for all of the poles to the closed position.

In addition to the bimetal element 45 for each of the poles, the trip device also includes a series overload tripping magnet 79 (FIG. 3) for each pole and a trip bar 81 common to all of the poles and biased to latching position by a spring 82 (FIG. 3). The trip bar 81 is made of insulating material and is pivotally supported by means of pins 83 (only one being shown) supported in a bracket 85 secured to the base 11 by the screws 42. The bracket 85 also supports an insulating base 87 for the trip device. A latch 91 (FIG. 3) on the trip bar 81 normally engages a latch mechanism 93 which, in turn, engages the cradle 63 to releasably restrain the operating mechanism in closed position.

The tripping magnet 79 comprises a U-shaped magnet yoke 95 (FIG. 3) supported on a bracket 97 which is rigidly supported on the base 87 for the trip device. A movable armature 99 is slidably supported in an extension 101 of the bracket 97 and has secured thereto a rod 103 which, at its outer end, has a head 105 for engaging and operating the trip bar 81 upon energization of the magnet. A spring 107 coiled about the rod 103 biases the rod and the armature 99 to the unattracted position. The tripping magnet 79 is energized by the terminal conductor 19 which extends between the legs of the U-shaped magnet yoke.

When a low overload current occurs the bimetal element 45 is heated by the heater element 43 and when heated a predetermined amount bends toward the right (FIG. 3) to engage an adjusting screw 109 on the trip bar 81 and actuates the latter to effect release of the cradle 63 and opening of the breaker contacts after a time delay.

The circuit breaker is tripped open instantaneously by operation of the tripping magnet 79. When the magnet is energized by overload currents of, for instance, 1000% or more of normal rated current, or by a short-circuit current, the armature 99 is attracted causing the head 105 to engage and actuate the trip bar 81 thereby effecting instantaneous release of the cradle 63. This effects automatic opening of the contacts of all three poles of the breaker.

It is necessary to reset and relatch the mechanism before the breaker contacts can be closed following an automatic opening operation. Resetting and relatching is effected by moving the handle clockwise as far as it will go. During this movement a projection 111 on the operating lever 55 engages a shoulder on the cradle 63 and moves the latter in a clockwise direction. Near the end of the clockwise movement of the cradle 63 the latching end thereof is reengaged with the latch mechanism 93 in a well-known manner. The breaker contacts are then closed in the previously described manner by movement of the handle to the "on" position.

The arc extinguisher 25 may be of any suitable type, the one shown consisting of a plurality of slotted plates of magnetic material, into which the arc is drawn and quickly extinguished.

The circuit breaker illustrated, by way of example, may have a continuous current-carrying capacity of 225 amperes and an interrupting capacity of 25,000 amperes at 600 volts alternating current, and will safely interrupt fault currents up to its interrupting capacity. Buildings, such as factories, hospitals, apartment buildings, etc., have branch and feeder circuits for lighting and power circuits. Such circuits are, at times, connected to power sources that are capable of full amplitude instantaneous fault currents in the neighborhood of 100,000 or more amperes which far exceeds the interrupting capacity of the circuit breaker. Inserting current-limiting fuses having a higher interrupting capacity than that of the circuit breaker in series with the circuits through the several poles of the breaker permits the circuit breaker to function normally to interrupt fault currents up to values less than its interrupting capacity, but, should a fault current of greater magnitude than the interrupting capacity of the circuit breaker occur, the current-limiting fuses become effective to interrupt the current.

Such a circuit interrupter structure, of which the instant application is an improvement, is disclosed in application Serial No. 457,135, filed September 20, 1954, by Lloyd W. Dyer, and assigned to the assignee of this application.

In the application just referred to, the current-limiting fuses are disposed in open compartments outside the breaker cover and at the line end of the breaker. It is possible to close the circuit breaker before a blown fuse is replaced. This fact, together with the easy accessibility of the fuses may present a hazard to a person attempting to replace one or more of the fuses.

This invention is also an improvement over that disclosed in the application of Howard E. Reichert and Robert H. Flick, Serial No. 604,697, filed August 17, 1956.

The current-limiting fuses 113 for the three poles of the interrupter of this invention are all mounted in a separate removable fuse housing which is attached to the load end of the circuit breaker housing so that it can be removed, together with the fuses, without removing the circuit breaker cover.

One advantage of the present invention is the provision of interlocking means for tripping the breaker when any one of the fuses blows and for holding the breaker tripped until the blown fuse is removed. Also the invention provides interlocking means for tripping the breaker when the fuses are removed and for holding the breaker tripped until the fuses are replaced. The interlocking means thus make access to the fuses impossible while the breaker is in the closed position.

An important feature of the invention is the means which maintains the breaker in tripped condition if one of the fuses is omitted when the fuse housing is replaced.

Each pole of the circuit interrupter is provided with a current-limiting fuse 113, one blade or plug-in terminal 115 of which is positively secured to the fuse and is frictionally connected to the intermediate terminal 19 by means of a plug-in connector 116 secured by a screw 117 to the terminal 19. The other blade or plug-in terminal 121 of the fuse 113 is similarly connected to the fuse and to the load terminal 17 by a plug-in connector 119. The contact surfaces of the plug-in terminals 115 and 121 which make contacting engagement with the plug-in connectors 116 and 119 are generally normal to the length of the circuit breaker; and the connectors face outwardly so that the fuses may be removed and replaced by endwise movement in a direction along the longitudinal axes of the fuses and substantially perpendicular to the length or base of the circuit breaker.

The line terminals 15 and the load terminals 17 at opposite ends of the base 11 are provided respectively with suitable connectors such as the plug-in devices 127 and 129 for connecting the circuit interrupter in an electrical circuit. Such connections are not provided for the intermediate terminals since all of the current flows through both the circuit breaker and the fuses.

The fuse-receiving plug-in connectors 116 and 119 each comprises a fixed angular conducting member 131 engaging the blades of the fuse and a contact plate 133 disposed on the other side of the blade is biased against the blade by means of a spring 135 which is compressed between the contact plate and the head 137 of a rivet 139 riveted to the angular conducting member 131. The inner plug-in connectors 116 are mounted on an insulating block 141 secured by screws 143 to the base 11 of the breaker, and an insulating shield mounted between the end of the intermediate terminal 19 and the block 141 has a portion 145 extending upwardly between the plug-in connectors 116 and 119.

The fuses 113 for all of the poles are mounted in a separate fuse housing member 147 which is removably attached to the load end of the circuit breaker housing so that it can be removed without removing the circuit breaker cover. The fuse housing comprises a base portion 149 and a cover portion 151 secured together by screws 153. The portions 149 and 151 of the fuse housing 147 are also secured together and the fuse housing is secured to the breaker cover 13 by screws 155 and nuts 157. Long mounting screws 159 extending through openings in the fuse housing 147 and through openings in the base 11 of the breaker serve to hold the fuse housing in place on the base 11 of the breaker and to mount the breaker on a suitable support means.

The outer end of the housing member 147 projects outwardly beyond the outer face of the circuit breaker cover 13 so that it may project through an opening in a switchboard panel as hereinafter described. All of the nuts 157 and screws 159 for holding the fuse assembly on the circuit breaker are accessible at the outer projecting end of the housing member 147 so that they may be unscrewed from the front of the breaker while the breaker is behind the panel. On the other hand, the screws 153 which clamp all of the fuses endwise between the two housing members 149 and 151 are not accessible at the outer face of the circuit breaker and can be conveniently released to permit removal of one or more of the fuses from the fuse housing only after the fuse housing is removed from the circuit interrupter to give access to the under side of the fuse housing.

When the fuse housing is mounted in place on the circuit interrupter as shown in FIG. 3, the respective ends of the fuses 113 are clamped between the cover portion 151 and a shoulder 161 on the base portion 149 of the fuse housing and the fuse blades or plug-in terminals 115 and 121 are engaged respectively in the plug-in connectors 116 and 119 on the breaker base.

When a heavy overload current close to or above the interrupting capacity of the circuit breaker occurs, one or more of the fuses 113 (FIG. 3) will blow and interrupt the current. The tripping electromagnet 79 will also function to actuate the trip bar 81 and trip the breaker open even though the fuse will interrupt the current before the breaker contacts open.

Means is provided to hold the trip bar in the tripped position following the blowing of a fuse, thus preventing relatching the breaker mechanism and closing the breaker contacts until the blown fuse is removed. This means comprises a spring-loaded plunger 163 (FIG. 4) on each of the fuses that is actuated downwardly when the fuse blows, and engages an angular trip actuating member 165. The spring-loaded plunger 163 may be actuated upon blowing of the fuse, as shown in H. L. Rawlins Patent No. 2,435,844, issued February 10, 1948. The trip actuating member 165 for each pole extends toward the trip bar 81 and each has an upwardly extending portion 167 which engages one of the brackets 169 secured to the upper portion of the trip bar 81. Each actuating member 165 is provided with spaced ears 171 which pivotally support the member on a pivot pin 173 mounted in an ear 175 struck out from the portion 131 of its associated plug-in connector 116.

Figure 4:
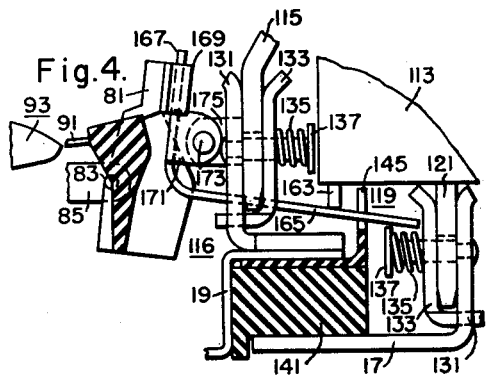
FIG. 4 is a detail view showing the mechanism for moving the trip bar to tripping position when one of the fuses blows.

When the fuse 113 for any one of the poles of the interrupter blows, the plunger 163 of the affected fuse is released and driven downwardly to the position in which it is shown in FIG. 4, rotating the actuator 165 clockwise about the pivot 173. During this movement of the actuator 165 the portion 167 thereof acting through the bracket 169 moves the trip bar 81 to the tripping position and holds the trip bar in tripping position until the blown fuse is removed. With the trip bar held in the tripped position the circuit breaker mechanism cannot be reset and the breaker cannot be closed.

The fuse housing 147 together with all of the fuses 113 are removed from the interrupter as a unit by removing the nuts 157 from the bolts or screws 155 and removing the mounting bolts 159. The fuse housing together with the fuses is then removed by lifting upwardly on the fuse housing which movement withdraws the fuse blades 115 and 121 from their respective plug-in connectors 116 and 119. As the fuses and their housing are removed the spring 82 (FIG. 3) returns the trip bar 81 to its normal position and the trip bar through the brackets 169 returns the actuators 165 to their normal positions. With the trip bar 81 restored to its normal position the breaker mechanism could be reset and the breaker contacts closed. However, means is provided for preventing return of the trip bar to its latching position when the fuses are removed and for holding the trip bar in unlatching position until the fuses are reengaged with their plug-in connectors.

Figure 5:
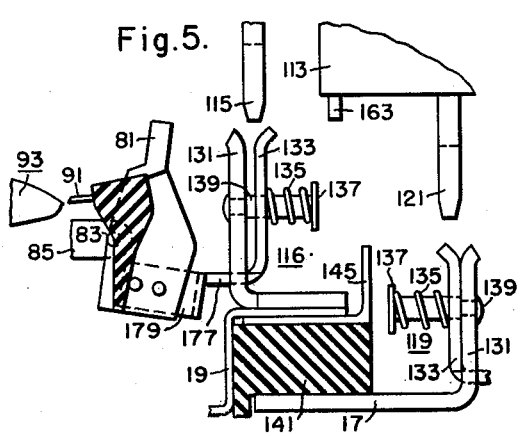
FIG. 5 is a detail view showing the means for moving the trip bar to the tripping position when the fuses are removed.

The means for preventing restoration of the trip bar to its latching position until all of the fuses are in position in the interrupter includes each plug-in connector 116. The spring biased contact plate 133 has an angular actuating portion 177 (FIGS. 3 and 5) which extends through an opening in the member 131 to guide the plate 133 when the fuse blade 115 is removed from and inserted in the plug-in connector. The end of the portion 177 of each contact plate 133 is disposed adjacent a bracket 179 secured to a portion of the trip bar 81 below the pivot 83 therefor.

When the fuses are removed from the interrupters, the fuse blades 115 and 121 are withdrawn from their respective plug-in devices and, as the blades separate from the plug-in devices the springs 135 move the plates 133 toward the members 131. When this occurs the actuating portion 177 of the plate 133 for the plug-in 116 engages the bracket 179 and moves the trip bar 81 to the tripping position. The springs 135 for each pole of the breaker will hold the trip bar 81 in the tripping position, preventing relatching of the mechanism and closing of the breaker until all of the fuses are replaced in position in the interrupter.

When the fuses are replaced the fuse blades 115 engage and move the plates 133 toward the right, causing the portion 177 to free the trip bar 81 which is returned to its normal latching position by the spring 82 (FIG. 3) after which the breaker may be reset and the contacts closed. If, however, any one of the fuses is omitted from the fuse housing when the latter is replaced on the breaker, the spring 135 for that pole will hold the plate 133 in the position shown in FIG. 5, thus holding the trip bar 81 in the tripping position preventing resetting of the mechanism and closing the breaker contacts until all of the fuses are in position. Should the fuse housing and the fuses be replaced with a blown fuse still in the housing, the spring loaded plunger 163 of the blown fuse will engage and move the actuator 165 to the position shown in FIG. 4, thus moving the trip bar 81 back to its tripping position.

It is thus seen that each plate 133 and its actuating portion 177 comprises means which is individually responsive to the absence of one of the three fuses (not just to the absence of the fuse cover or housing) for holding the trip bar in tripped position. This means that the breaker mechanism cannot be reset and the breaker contacts cannot be closed unless all of the fuses are in position. This construction has important advantages over structures having only means responsive to the presence of the fuse cover or housing for preventing resetting of the mechanism, since such structures can be reclosed to energize one or more conductors even though one or more of the fuses may be missing. The use of means responsive to the absence of each individual fuse itself, in combination with the means responsive to the blowing of each individual fuse to trip the breaker, gives positive assurance that the breaker cannot be closed without all of the fuses being present and in condition to conduct current, so that single-phase operation of a three-phase circuit is prevented.

Thus, there is provided interlocking means between the fuses and the trip bar of the breaker, by which the trip bar is moved to tripped position so that the breaker mechanism cannot be reset and the contacts may not be closed unless these conditions are met: First, all of the fuses must be intact or not blown; and second there must be a fuse present in each space where a fuse may be mounted.

Figure 6:
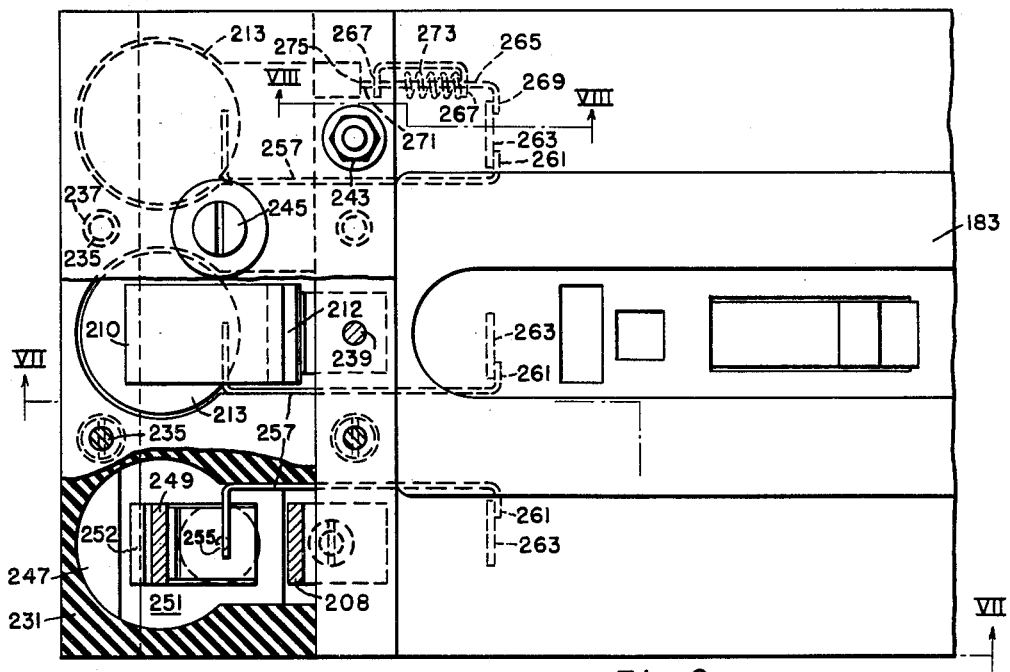
FIG. 6 is a top plan view of the trip portion of a circuit interrupter showing certain aspects of the invention applied to a circuit breaker having a somewhat different trip device.
Figure 7:
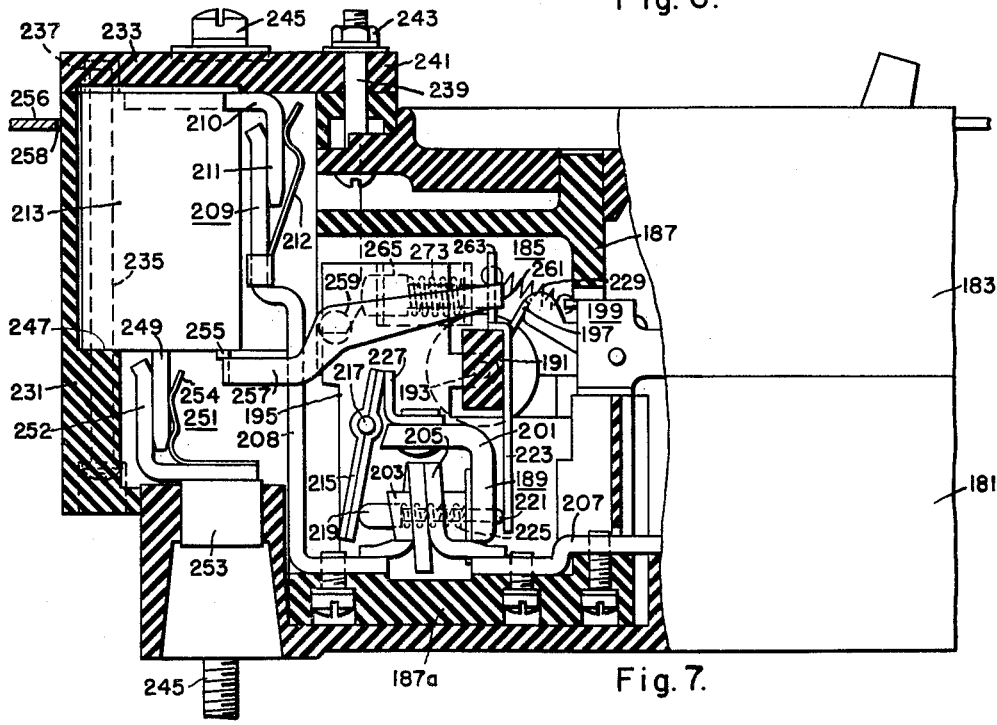
FIG. 7 is a vertical sectional view taken on line VII—VII of FIG. 6 and looking in the direction indicated by the arrows.

FIGS. 6 and 7 illustrate the invention as applied to a multipole circuit breaker having a somewhat different form of trip device. Referring to FIG. 7, a base 181 and cover 183 both of molded insulating material are provided for the multipole circuit breaker, only the trip device of which is shown in detail, since the operating mechanism may be of the same type described above. The trip device is shown generally at 185 supported in its own insulating housing comprising cover 187 and base 187a which is rigidly mounted in the breaker housing adjacent one end thereof. The trip unit cover may be sealed to the trip unit base to prevent tampering with the tripping calibration, and the breaker cover then need not be sealed to the main breaker base.

The trip device comprises a series of overload magnet 189 for each pole of the breaker and a trip bar 191 common to all of the poles. The trip bar 191 is made of insulating material and is pivotally mounted at its ends by pins 193, only one of which is shown molded into the ends of the trip bar and supported in end brackets 195 (only one being shown) rigidly mounted on the base 187a of the trip device housing. A latch 197 on the trip bar 191 normally engages a latch mechanism 199 which, in turn, engages and releasably restrains the breaker operating mechanism in operative position.

The tripping magnet 189 comprises an angular magnet yoke 201 supported in the bracket 195 and a companion bracket (not shown) there being a pair of brackets 195 for each pole of the breaker. One leg of the magnet yoke comprises a fixed core 203 which extends through an energizing coil 205 having one end secured to a conducting strip 207 secured to the base of the trip device housing. The other end of the conducting strip extends into the circuit breaker housing and is connected to the moving contact structure of the interrupter by a flexible conductor (not shown). The other end of the coil 205 is connected to a conducting strip 208 which extends upwardly into a fuse compartment and has a plug-in type terminal 209 mounted on the upper end thereof for receiving the plug-in terminal 211 at one side of a fuse 213. The plug-in connector 209 includes a spring member 212 of resilient material, such as steel, for applying contact pressure between the current-carrying members 208 and 211 of good conducting material such as copper. The trip device for each of the poles is provided with an armature 215 pivoted on a pin 217 supported in the frames 195. A trip rod 219 slidably mounted in an opening in the core 203 is adapted to be actuated by the armature 215 and operate the trip bar 191. The reduced right-hand end 221 of the trip rod extends through an opening in the lower end of the magnet yoke 201 and engages the lower end of a bracket 223 secured to the trip bar 191. The trip rod 219 is biased to the left by a spring 225 compressed between the magnet yoke 201 and a shoulder on the plunger. The spring 225 acting through the trip rod 221 also biases the armature 215 to its unattracted position as shown in FIG. 7 against an adjusting bracket 227 mounted on the horizontal leg of the magnet yoke 201.

When the tripping magnet 189 for any pole of the breaker is energized in response to an overload current of sufficient magnitude, the armature 215 is attracted against the core 203 thrusting the trip rod 221 toward the right and, through the bracket 223, rotates the trip bar 191 counterclockwise or in tripping direction. This disengages the latch 197 from the latch mechanism 199 and effects opening of the circuit breaker in the manner previously described. A spring 229 restores the trip bar to its latching position when the breaker mechanism is reset.

The fuses 213, of which there is one for each pole of the breaker, are mounted in a separate removable housing which is attached to the load end of the circuit breaker housing so that it can be removed without removing the circuit breaker cover. The fuse housing comprises a base 231 and a cover 233 secured together by means of screws 235 which extend up through openings in the under side of the base 231 and threadedly engage metal inserts 237 molded in barriers in the cover 233 of the fuse housing. The fuse housing is secured in place on the breaker housing by means of bolts 239 extending through openings in an overlapping portion 241 of the cover 233 and the nuts 243. Mounting screws 245 which pass through openings in the fuse cover 233, the fuse base 231 and the base 181 of the breaker housing serve to hold the fuse housing on the breaker housing and to secure the breaker to the support member on which it is mounted.

When the screws 235 are tightened the fuses 213 are rigidly clamped between the fuse cover 233 and a shoulder 247 on the fuse base 231. When the fuse housing with the fuses mounted therein is in position on the circuit breaker the upper terminals or blades 211 of the fuses are engaged in the plug-in terminals 209. The lower terminal or blade 249 of the fuse engages a plug-in connector 251 secured to a terminal 253 at the adjacent end of the base 181 of the breaker housing. The connector 251 includes a good conducting member 252 for carrying the current and a resilient or spring member 254 for applying contact pressure.

When an overload current close to or above the interrupting capacity of the circuit breaker occurs, one or more of the fuses 213 (FIG. 6) will blow and interrupt the current. The tripping magnet 189 will also function to actuate the trip bar 191 and trip the breaker open even though the fuse will interrupt the current before the breaker contacts open. Means is provided to hold the trip bar in the tripped position, thus preventing relatching the breaker mechanism and closing the breaker, until the blown fuse is removed. This means comprises a spring loaded plunger 255 on each of the fuses that is actuated downwardly when the fuse blows, and a pivoted actuating lever 257 pivotally mounted on a pin 259 in the frame 195.

When the fuse for any one of the poles of the interrupter blows, the plunger 255 of that fuse is released and driven downwardly, moving the actuating lever 257 in a counterclockwise direction about its pivot 259. This movement of the lever 257 causes an ear 261 (FIGS. 6 and 7) thereon to engage the upper end 263 of the bracket 223 above the pivot 193 on the trip bar 191 and move the trip bar to tripping position. As long as the blown fuse remains in position in the interrupter, the trip bar will be held in the tripped position, and will prevent resetting of the breaker and closing of the breaker contacts until the blown fuse is removed.

The fuse housing together with the fuses are removed as a unit by first removing the nuts 243 and the mounting screws 245 and then lifting the fuse housing upwardly to separate the terminals 211 and 249 of the fuses from the plug-in connectors 209 and 251. As the fuses and their housing are removed the actuators 257 return to their normal positions and the spring 229 restores the trip bar to its latching position, making it possible to relatch the mechanism and close the breaker. However, means is provided to prevent returning the trip bar 191 to the latching position when the fuse housing is removed and to hold the trip bar in unlatching position until the fuse housing is again placed in position on the interrupter.

The means for holding the trip bar in the tripped position when the fuse housing is removed comprises a slide 265 (FIGS. 6 and 8) mounted in openings in spaced ears 267 on the frame 195. The right end of the slide 265 has an ear 269 thereon which engages the upper end 263 of the bracket 223 on the trip bar 191. The other end of the slide 265 is provided with a rounded head 271 which is biased by means of a spring 273 into engagement with a cam surface 275 on the base portion 231 of the fuse housing. The spring 273 is compressed between the head 271 and one of the ears 267.

When the fuse housing is removed, together with the fuses, the plunger 255 of the blown fuse is moved upwardly therewith and permits the lever 257 to return to its normal position as shown in FIG. 7. However, by the time the plunger 255 releases the lever 257 the cam surface 275 has been moved far enough to permit the spring 273 to move the slide 265 far enough to the left to hold the trip bar 191 in the tripped position or to move it back to the tripped position. When the fuse housing is replaced, the cam surface 275 engages and moves the slide 265 to the right, permitting the spring 229 to restore the trip bar 191 to its latching position after which the breaker may be reset and the contacts closed.

It is to be noted that the upper terminal of the fuse includes a conducting strip 210 extending from the end of the fuse down one side of the fuse in a direction parallel to the longitudinal axis thereof and terminates in the plug-in portion 211 which engages the plug-in connector 209 in such a direction that the fuse is plugged in and pulled out in a direction endwise of the fuse or parallel to its longitudinal axis. The other plug-in connector 251 is similarly positioned below the lower end of the fuse to be engaged by the plug-in fuse terminal 249 which projects outwardly from one end of the fuse in a direction generally parallel to its longitudinal axis.

This arrangement of the fuse terminals and their connectors, which is shown in FIGS. 1–5 as well as in FIGS. 6 and 7, makes it possible to mount each fuse endwise with its axis perpendicular to the length of the circuit breaker. This keeps the over-all length of the fused breaker combination to a minimum and permits a maximum number of such devices to be mounted in a given space.

This endwise mounting of the fuses makes it possible to mount the circuit breaker in a panelboard or behind a switchboard panel with a smaller opening through which the upper end of the fuse housing or cover projects so that the fuses may be removed and replaced from the front by endwise movement through the opening in the panel. Thus, as shown in FIG. 2, the circuit breaker may be mounted behind a steel panel 154 of a switchboard having an opening 156 through which the handle projects so that it may be operated from the front of the switchboard. The fuse assembly projects above the outer face of the cover 13 of the circuit breaker, and extends through the opening 148 in the panel. It will be noted that the nuts 243 and the screws 245 may be removed from the front of the panel. This makes it possible to remove the fuses from the front of the switchboard and without removing the panel 154. The fact that the fuse assembly extends outwardly beyond the main outer surface of the breaker and through the hole in the panel makes it easy to take hold of it and pull it to overcome the friction of the plug-in contacts.

As shown in FIG. 7, the breaker of the second modification may be similarly mounted behind a panel 256 with the fuses and the fuse assembly removable endwise through the opening 258 through which the outer end of the fuses project, with the advantages previously pointed out.

The invention provides a circuit interrupting device comprising a manually and automatically operable circuit breaker having current-limiting fuses of high interrupting capacity in series therewith. The operating characteristics of the two devices are so related that the circuit breaker functions in a conventional manner in response to fault currents within its interrupting capacity and the fuses become effective to interrupt fault currents greater than those which the circuit breaker can safely interrupt. The circuit breaker is mounted in its own insulating housing and the current-limiting fuses are mounted in a separate housing which is removably mounted on the circuit breaker housing. Means is provided for preventing resetting of the breaker mechanism and closing of the breaker contacts following the blowing of a fuse until the blown fuse is removed.

An important feature of the invention is that means is provided for preventing resetting of the breaker mechanism when the fuse housing is removed and until it is replaced in position on the interrupter with all of the fuses intact therein. This is accomplished by providing means responsive to the physical presence of each of the fuses, for preventing resetting of the breaker if any fuse is absent.

Having described the invention in accordance with the provisions of the patent statutes, it is to be understood that various changes and modifications may be made in the structural details disclosed and in the arrangement of parts without departing from the spirit of the invention.

We claim as our invention:

1. A circuit interrupting device comprising separable contact means and means releasable to effect separation of said contact means, fuse means connected in series relation with said separable contact means, plug-in type connectors for removably connecting said fuse means, means actuated when said fuse means blows to effect release of said releasable means and to hold it released until the blown fuse means is removed, and a member forming a part of one of said plug-in connectors operable when said fuse means is removed to effect release of said releasable means and to hold it released until said fuse means is replaced.

2. A multipole circuit interrupting device comprising a plurality of separable contact means, spring-biased means storing energy releasable to effect separation of said plurality of contact means, a plurality of removably mounted fuse means each connected in series relation with one of said separable contact means, means actuated when one of said fuse means blows to effect release of said releasable means, and a plurality of independently movable members each responsive to the absence of one of said fuse means to mechanically effect release of said releasable means and separation of a plurality of said separable contact means whenever one of said fuse means is absent, and said separation of the contact means being effected entirely mechanically by the energy stored in the device.

3. A multipole circuit interrupting device comprising a plurality of sets of separable contact means and means releasable to effect separation of all of said sets of contact means, a common trip member movable to a tripping position to effect release of said releasable means, a plurality of fuse means each connected in series relation with one set of said separable contact means, an insulating housing supporting said fuse means and removably mounted on said interrupter, a plurality of independently movable levers pivoted intermediate their ends and each having one end disposed to effect movement of said common trip member to tripping position, a plurality of spring biased plungers each actuated when one of said fuse means blows to actuate the other end of one of said levers independently of the other levers and effect movement of said common trip member to tripping position, each said spring-biased plunger maintaining said common trip member in tripping position until its said fuse means is removed, and a plurality of stored energy operated members each operable when said housing and fuse means are removed to actuate said common trip member to tripping position, any one of said stored energy operated members maintaining said common trip member in said tripping position until all have been returned to the position occupied when said housing and fuse means are replaced.

4. A circuit interrupting device comprising separable contact means and means releasable to effect separation of said contact means, a trip member movable to a tripping position to effect release of said releasable means, fuse means having terminals thereon connected in series relation with said separable contact means, plug-in connector means for receiving at least one of said fuse terminals, a trip actuating part on said connector biased to provide contact pressure on the associated fuse terminal, said trip actuating part when said fuse terminal is removed by removal of said fuse being moved to cause movement of said trip member to tripping position and to hold said trip member in tripping position until said fuse is replaced.

5. A circuit interrupting device comprising relatively movable contact means and means releasable to effect opening of said contact means, a trip member movable to a tripping position to effect release of said releasable means, fuse means having terminals thereon for connecting said fuse means in series relation with said contact means, a pivoted lever having one end disposed adjacent said fuse means and the other end adjacent said trip member, means comprising a spring-biased plunger actuated when said fuse means blows to cause said lever to move said trip member to tripping position and to hold said trip member in tripping position until said fuse means is removed from said interrupter, a plug-in connector for receiving one of said fuse terminals, said plug-in connector comprising a fixed conducting member and a biased trip actuating contact member movably mounted on said fixed member, said fixed member and said biased contact being disposed to receive said fuse terminal therebetween, and said biased trip actuating contact being operable when said fuse terminal is removed to move said trip member to tripping position and to hold said trip member in tripping position until said fuse terminal is reinserted in said plug-in connector.

6. A multipole circuit interrupting device comprising separable contact means for each pole of the interrupter and means releasable to effect separation of the contact means for all of the poles, a trip bar common to all of the poles movable to a tripping position to effect release of said releasable means, a trip device operable in response to overload currents to move said trip bar to tripping position, a fuse in each of a plurality of said poles having terminals thereon for connecting said fuse in series relation with said separable contact means, means operable when any one of said fuses blows to move said trip bar to tripping position, a plug-in connector in each pole for removably receiving at least one of the terminals for the fuse in that pole, each of said plug-in connectors comprising a fixed conducting member and a biased trip actuating movable contact member, said fixed members and said biased contact members being disposed to receive said fuse terminals therebetween, and any one of said biased trip actuating contact members being operable when the associated fuse terminal is removed to move said trip bar to tripping position.

7. A circuit interrupting device comprising separable contact means and means releasable to effect separation of said contact means, a trip bar movable to a tripping position to effect release of said releasable means, fuse means having terminals thereon for connecting said fuse means in series relation with said separable contact means, a plug-in connector for receiving at least one of said terminals, a lever pivotally mounted on said plug-in connector having one end disposed to engage said trip bar, and means comprising a spring-biased plunger actuated when said fuse means blows to operate said lever and cause said lever to move said trip bar to tripping position.

8. A circuit interrupting device comprising separable contact means and means releasable to effect separation of said contact means, a trip bar movable to a tripping position to effect release of said releasable means, fuse means having terminals thereon for connecting said fuse means in series relation with said separable contact means, a plug-in connector for receiving at least one of said terminals, a lever pivotally mounted on said plug-in connector having one end disposed to engage said trip bar, means comprising a spring-biased plunger actuated when said fuse means blows to operate said lever and cause said lever to move said trip bar to tripping position, and stored energy means operable when said fuse terminal is removed from said plug-in connector to move said trip bar to tripping position.

9. A circuit interrupting device including a plurality of separable contact means, trip means for causing opening of said plurality of contact means, electroresponsive means for actuating said trip means to cause opening of said plurality of contact means upon the occurrence of a predetermined condition, a plurality of fuses each removably connected in series with one of said separable contact means, and mechanism extending between said fuses and said trip means for actuating said trip means independently of said electroresponsive means to mechanically cause opening of a plurality of said separable contact means upon the blowing of any one of the fuses and upon the absence of any one of said fuses even though another of said fuses may be present.

10. A multipole circuit interrupting device including separable contact means for each of a plurality of poles, trip means for causing opening of said plurality of contact means, electroresponsive means for actuating said trip means to cause opening of said plurality of contact means upon the occurrence of a predetermined condition, a plurality of fuses each including a fusible element and other parts removably connected in series with one of said separable contact means, and a plurality of individually movable members, each of said members being biased against one of said other parts on one of said fuses and normally held thereby independently of the fusible elements in an inoperative position, and each of said members being individually movable due to its bias to an operative position when said part on its respective fuse is not in position to hold it and thereby actuate said trip means to prevent closing of a plurality of said separable contact means.

11. A multipole circuit interrupting device comprising a plurality of separable contact means and means releasable to effect separation of all of said contact means, a trip member movable to a tripping position to effect release of said releasable means, fuse means connected in series relation with said separable contact means, a pivoted lever having one portion disposed to move and cause actuation of said trip member to tripping position, means comprising a spring biased plunger actuated when said fuse means blows to actuate said lever and cause movement of said trip member to tripping position, said spring-biased plunger causing said trip member to remain in tripping position until said fuse means is removed, said fuse means comprising a plurality of fuses, a plurality of individually movable members each biased to engage a portion on one of said fuses and being movable due to its bias upon the removal of its respective fuse to cause movement of said trip member to tripping position and separation of all of said contact means even though another of said fuses is in position.

12. In a circuit interrupting device, a circuit breaker having separable contacts and electroresponsive means for causing opening of the contacts, one or more fuses each having two plug-in terminals positively secured thereon, one of said plug-in terminals projecting in the direction of the longitudinal axis of the fuse beyond one end of the fuse centrally thereof, a conducting member on said fuse extending from the other end of the fuse to one side of the fuse and having the other plug-in terminal thereon extending in the direction of the longitudinal axis of the fuse and toward the first said end of the fuse, a pair of plug-in connectors for each fuse connected in circuit with the contacts of the circuit breaker, each said fuse being mounted with its longitudinal axis substantially perpendicular to the length of the circuit breaker and with one end of each fuse projecting forwardly of the front of the circuit breaker, and each said fuse being removable from the front of the circuit breaker by movement in the direction of the longitudinal axis of the fuse.

13. In a circuit interrupting device, a circuit breaker having separable contacts and electroresponsive means for causing opening of the contacts, one or more fuses each having two plug-in terminals forming part thereof, one of said plug-in terminals projecting in the direction of the longitudinal axis of the fuse only a short distance beyond one end of the fuse, a conducting member on said fuse extending from the other end of the fuse to one side of the fuse and having the other plug-in terminal thereon extending in the direction of the longitudinal axis of the fuse and toward the first said end of the fuse, said other plug-in terminal at the side of the fuse terminating short of the first said end of the fuse, a pair of plug-in connectors for each fuse connected in circuit with the contacts of the circuit breaker, said plug-in connectors of each pair being mounted in the circuit breaker at different distances from the back of the circuit breaker so that the connector nearest the back of the circuit breaker engages the plug-in terminal projecting a short distance beyond the end of the fuse and the connector at the greater distance from the back of the circuit breaker engages the plug-in terminal at the side of the fuse, and each said fuse being mounted with its longitudinal axis substantially perpendicular to the length of the circuit breaker and being removable from the circuit breaker by a single movement in the direction of the longitudinal axis of the fuse.

14. In a fuse, two plug-in terminals thereon each positively secured thereto and forming part of the fuse, one of said plug-in terminals being of rigid material and of less width than the body of the fuse and projecting in the direction of the longitudinal axis of the fuse substantially beyond one end of the body of the fuse, a conducting member of rigid material on said fuse extending from the other end of the fuse to one side of the fuse and having the other plug-in terminal thereon extending in the direction of the longitudinal axis of the fuse and toward the first said end of the fuse, and said other plug-in terminal at the side of the fuse terminating short of the first said end of the fuse.

15. In a multipole circuit interrupter, separable contacts for each of a plurality of poles, releasable operating mechanism for controlling said separable contacts, electroresponsive trip means having a common trip bar movable to cause release of the operating mechanism and separation of the contacts, a plurality of fuses removably mounted on the circuit interrupter, a fuse housing connecting said plurality of fuses together for removal from and replacement on the circuit interrupter as a unit, a plurality of individually movable members each engaging a part of a different one of the plurality of fuses, said individually movable members being each operable in the absence of its corresponding fuse from the fuse housing to cause said common trip bar to be actuated to released position and prevent closing of the separable contacts until all of the plurality of fuses are present in the fuse housing.

16. In a multipole circuit interrupter, separable contacts for each of a plurality of poles, releasable operating mechanism for controlling said separable contacts, electroresponsive trip means having a common trip bar movable to cause release of the operating mechanism and separation of the contacts, a plurality of fuses removably mounted on the circuit interrupter, a fuse housing connecting said plurality of fuses together for removal from and replacement on the circuit interrupter as a unit from the front of the circuit interrupter, disengageable terminals electrically connecting each fuse in series circuit with one pole of the circuit interrupter, securing means independent of said terminals holding said plurality of fuses in said fuse housing and releasable only from the under side of the fuse housing to permit convenient removal of one or more of the fuses from the fuse housing only after the fuse housing has been removed from the circuit interrupter, a plurality of individually movable members each engaging a part of a different one of the plurality of fuses, said individually movable members being each operable in the absence of its corresponding fuse from the fuse housing to cause said common trip bar to be actuated to released position and prevent closing of the separable contacts until all of the plurality of fuses are present in the fuse housing.

17. In a multipole circuit interrupting device, a base, a circuit breaker having a set of separable contacts for each pole on the base and electroresponsive means for causing opening of said sets of contacts, a pair of plug-in connectors for each pole mounted on said base adjacent one end thereof with one connector of each pair near said end of the base and the other connector of its pair more remote from said end of the base, said connector of each pair nearest said end of the base being positioned at one level and the other more remote connector of each pair being positioned at a different level at a greater distance from the back of the base than the level of the connectors nearer the said end of the base, a fuse positioned end-wise over the connector of each pair nearest said end of the base and each fuse having a projecting plug-in terminal directly under and close to its end and engaging the connector under its end, a conductor positively secured to and forming part of each fuse and extending laterally from the other end of each fuse in the direction away from said end of the base and having thereon a plug-in terminal engaging the other more remote connector of its pair at a level higher than the connector of its pair nearest the said end of the base.

18. In a multipole circuit interrupting device, a base, a circuit breaker on the base having a set of separable contacts for each pole and electroresponsive means for causing opening of all of said sets of contacts, a plug-in connector for each pole mounted on said base adjacent one end thereof, a plurality of fuses each having a body and two plug-in terminal portions thereon, each fuse being mounted endwise over one of said plug-in connectors adjacent the end of the base and having one plug-in terminal portion of smaller size than the fuse body projecting centrally from the inner end of the fuse body in the direction of the longitudinal axis of the fuse body and beyond the innermost end portion of the fuse body and engaging the plug-in connector therebeneath, a second plug-in connector for each pole mounted on the base at the side of the fuse body facing the circuit breaker and at a level at a greater distance from the back of the base than the level of the first said plug-in connectors adjacent the end of the base, a conducting member mounted on each fuse to be a part thereof extending laterally from the outer end of each fuse body in the direction away from said end of the base and having its other plug-in terminal portion thereon at the side of the fuse body nearest the circuit breaker and engaging the plug-in connector at the side of its fuse body nearest the circuit breaker.

19. In a circuit interrupting fuse, a fuse body having two plug-in terminal portions thereon, one of said plug-in terminal portions having a smaller cross-section than the fuse body and projecting centrally from one end of the fuse body in the direction of the longitudinal axis of the fuse body and beyond the outermost portion of said end of the fuse body, a conducting member positively secured to and extending laterally from the other end of the fuse body and having the other plug-in terminal portion thereon at the side of the fuse body and extending in the direction of the longitudinal axis of the fuse body and toward the first said one end of the fuse body, and said other plug-in terminal portion extending from the said other end of the fuse body along the side thereof a distance not substantially greater than a minor part of the length of the fuse body.

20. In a multipole circuit interrupting device, a base, a circuit breaker having a set of separable contacts for each pole on the base and electroresponsive means for causing opening of said sets of contacts, a pair of plug-in connectors for each pole mounted on said base adjacent one end thereof with one connector of each pair nearer said end of the base than the other connector of its pair, a plurality of fuses, a housing for said fuses including two members of insulating material between which the fuses are retained with one member of insulating material engaging one end of each of the fuses and the other member of insulating material engaging the other end of each of the fuses, said housing for the fuses being positioned on the base of the circuit interrupter with one end of each of the fuses over one of said connectors on the base nearest said end thereof, a plug-in terminal forming part of each fuse projecting downwardly under the end of each fuse and engaging the connector therebeneath on the base nearest said end thereof, a conductor forming part of each fuse extending laterally from the other end of each fuse to the side thereof more remote from said end of the base and having thereon a plug-in terminal extending downwardly at the side of the fuse away from said end of the base and engaging the other connector away from said end of the base, and said housing and the plurality of fuses being removable as a unit by movement in a direction longitudinally of the fuses and perpendicular to the bottom of the base.

21. In a multipole circuit interrupter, a base, a circuit breaker on the base having separable contacts for each pole and releasable operating mechanism for controlling said separable contacts, a pair of plug-in connectors for each pole with one connector for each pole mounted at one level adjacent one end of the base and the other connector for each pole mounted at a higher level from the back of the base and farther from said end of the base, a plurality of fuses each having a pair of plug-in terminals, a housing for said fuses including two members of insulating material between which the fuses are retained with the outer member of insulating material engaging the outer end of each of the fuses and the inner member of insulating material engaging the inner end of each of the fuses, a plurality of openings through the inner member of insulating material, each of said fuses in the housing being positioned endwise over one of the connectors adjacent the end of the base and having one plug-in terminal projecting longitudinally from the inner end of the fuse and into one of said openings in the inner member of insulating material and engaging the connector under the inner end of the fuse, a conductor extending laterally from the outer end of each fuse and having thereon a plug-in terminal at the side of the fuse and engaging one of the connectors at the higher level, and said conductor and the terminal thereon being under the outer member of insulating material so as to be covered thereby.

References Cited in the file of this patent

UNITED STATES PATENTS

| | | |
|---|---|---|
| 826,888 | Sachs | July 24, 1906 |
| 974,109 | Auel et al. | Nov. 1, 1910 |
| 1,012,145 | Murray | Dec. 19, 1911 |
| 1,028,258 | Murray | June 14, 1912 |
| 1,962,867 | Green | June 12, 1934 |
| 1,972,958 | Steinmayer et al. | Sept. 11, 1934 |
| 2,330,690 | Dannenberg | Sept. 28, 1943 |
| 2,376,789 | Leonard | May 22, 1945 |
| 2,465,079 | Fitzgerald | Mar. 22, 1949 |
| 2,473,196 | Dannenberg | June 14, 1949 |
| 2,476,071 | Spiro | July 12, 1949 |
| 2,486,300 | Lindstrom et al. | Oct. 25, 1949 |
| 2,666,824 | Dorfman | Jan. 19, 1954 |
| 2,761,932 | Kozacka et al. | Sept. 4, 1956 |
| 2,824,929 | Edmunds | Feb. 25, 1958 |
| 2,843,702 | Edmunds | July 15, 1958 |
| 2,846,545 | Edmunds | Aug. 5, 1958 |
| 2,888,535 | Edmunds | May 26, 1959 |
| 2,924,686 | Edmunds | Feb. 9, 1960 |

FOREIGN PATENTS

| | | |
|---|---|---|
| 13,522 | Australia | Dec. 13, 1934 |